Figure 1:
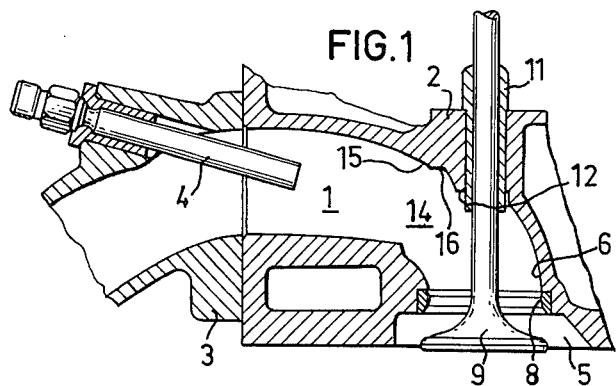

United States Patent [19]

Gillbrand et al.

[11] 4,123,996
[45] Nov. 7, 1978

[54] INTERNAL COMBUSTION ENGINES

[75] Inventors: Per S. Gillbrand, Enhörna; Bengt G. Gadefelt, Södertälje, both of Sweden

[73] Assignee: Saab-Scania Aktiebolag, Sodertalje, Sweden

[21] Appl. No.: 720,388

[22] Filed: Sep. 3, 1976

[30] Foreign Application Priority Data

Sep. 8, 1975 [SE] Sweden ............................. 7509955
May 25, 1976 [SE] Sweden ............................. 7605895

[51] Int. Cl.² ..................................... F02B 75/12
[52] U.S. Cl. ................................. 123/1 R; 123/52 M;
123/141
[58] Field of Search ............... 123/141, 52 M, 191 M, 123/1 R, 188 M

[56] References Cited

U.S. PATENT DOCUMENTS

| 3,693,606 | 9/1972 | Hardenberg | 123/141 |
| 3,820,522 | 6/1974 | Scherenberg | 123/141 X |
| 3,874,357 | 4/1975 | List et al. | 123/141 X |
| 3,933,142 | 1/1976 | List et al. | 123/52 M X |

*Primary Examiner*—Ira S. Lazarus
*Attorney, Agent, or Firm*—Cushman, Darby & Cushman

[57] ABSTRACT

A spark ignited Otto cycle type engine have a fixed compression ratio which is supplied with a mixture of air and fuel having an octane number lower than that which would normally be appropriate for the compression ratio. The engine operates in a range below a predetermined high load without spontaneous combustion of the fuel-air mixture but will be susceptible to spontaneous combustion when operated above the predetermined high load. The engine includes means for controlling combustion of the fuel-air mixture when operating above the predetermined high load in a manner to decrease the efficiency of the engine and to prevent spontaneous combustion which would otherwise occur.

12 Claims, 4 Drawing Figures

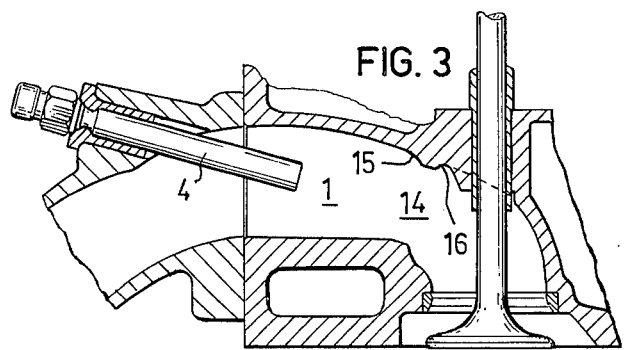
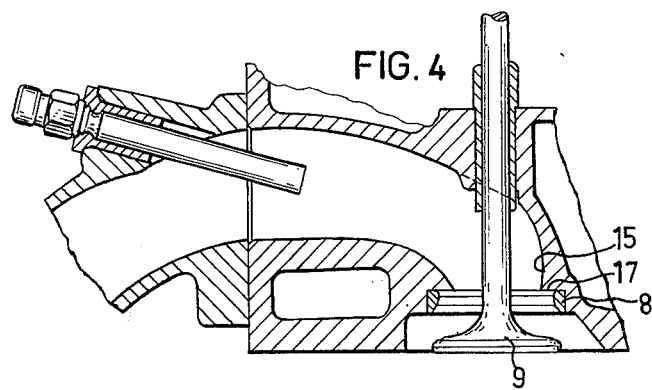

INTERNAL COMBUSTION ENGINES

The present invention relates to spark-ignition internal combustion engines, such as an Otto-cycle engine.

Within the motor industry, attempts are being made to increase the efficiency of internal combustion engines in step with rising fuel costs and ever stricter emission requirements. In the case of a spark-ignition internal combustion engine, such as an Otto-cycle engine, it is a known fact that the thermal efficiency of such an engine increases with increasing compression ratio $\epsilon$ to reach a maximum at a compression ratio $\epsilon$ of around 17:1. The compression ratio $\epsilon$ is expressed as the ratio of the volumes enclosed above the piston in a cylinder at respective dead-centre positions of the piston. This compression ratio is limited in practice with respect to the ability of the fuel used to resist spontaneous combustion. Spontaneous combustion, or self-ignition, of a fuel-air mixture is unacceptable, since it results in a sudden, uncontrollably, high increase in pressure in the combustion chamber.

The self-ignition property of the fuel used is normally expressed by its octane number, this number increasing with the ability of the fuel to resist self-ignition during the combustion stage of a cycle. The octane number of petrol (or gasoline) is raised, in practice, mostly by adding lead-containing compounds, such as tetra ethyl lead, thereto. The exhaust gases consequently contain lead products which are harmful to the environment and as a result thereof it is generally desired to reduce the need to use such lead-containing fuels. Research being carried out an internal combustion engines is also directed toward the manufacture of engines which will run efficiently on low-priced fuels.

By way of summary, it can be said that the requirement of reduced lead emission and lower fuel prices favours the selection of a low compression ratio, while the requirement of increased efficiency and therewith lower fuel consumption calls for a high compression ratio. Thus, the final choice of compression ratio and the fuel best suited to an engine is, of necessity, a compromise. This is also true with the present invention, although with the difference that the range within which the compression ratio and fuel can be selected is much greater than with previously known engine arrangements.

The present invention is based on the knowledge that the internal combustion engine of a vehicle only operates at full load for short periods of time, for example, when the vehicle is accelerated strongly. With the majority of saloon cars, the engines thereof operate at full load for less than 5% of their total operating time. Despite this, it is common practice that those conditions which are experienced at full load determine the basic characteristics of an engine. The compression ratio of the engine being then selected in relation to the octane number of the recommended fuel that the highest possible power output can be taken from the engine during full load. In this way, the thermal efficiency of the engine reaches its highest value at full load, falling rapidly with decreasing load on the engine. The efficiency of the engine decreases due to the fact that the volume of fuel-air mixture drawn into the engine decreases as a function of the load, whereby combustion of the mixture in the engine is less complete, because the process of combustion does not take place under the same conditions of high pressure and temperature as when the engine works at full load.

Known attempts to increase the efficiency of an engine when operating at part load have resulted in engines being provided with devices for more or less automatically controlling the valve timings or the compression ratios, depending upon the load. These solutions, however, are both complicated and expensive and consequently have not been widely used in practice.

The present invention relates to a spark-ignition internal combustion engine in which a higher efficiency is obtained at part load by using simple and inexpensive expedients.

According to one aspect, the present invention is characterised by a method in which the engine is given a fixed compression ratio and is supplied with fuel having a lower octane number and pre-selected spontaneous combustion characteristics than is normal in conventional spark-ignition internal combustion engines at the given compression ratio, whereby the engine is only able to operate at optimum efficiency in a lower load range up to a predetermined load level without spontaneous combustion during the combustion process of the fuel-air mixture, and in that, in an upper load range above said predetermined load level, the efficiency of the engine in operation is consciously decreased by means to control the combustion of the fuel-air mixture in a manner to prevent spontaneous combustion during the combustion process of the fuel-air mixture.

According to another aspect, the present invention is characterised by a spark-ignition combustion engine wherein the compression ratio is set at a preferred fixed value which is higher than normal, in relation to the full load capability of the engine, the engine being intended for use with a fuel having an octane number lower than that normally appropriate to the compression ratio, whereby the engine is only able to operate in a lower load range, i.e. up to a pre-determined load level, without spontaneous combustion during the combustion process of the fuel-air mixture, and in that means are provided for controlling combustion of the fuel-air mixture in the upper load range, i.e. above said predetermined load level, by reduction of the volume of fuel-air mixture fed to the combustion chamber.

A significant feature of the invention is that the conventional method of permitting the calculated full load of an engine to determine the compression ratio and the quality of the fuel used has been ignored. The internal combustion engine of the invention is modified for a fixed compression ratio, which is higher than that which is normal in relation to the full-load capability of the engine. Also, the engine of the invention can be run on a fuel having a lower octane number and preselected self-ignition characteristics than fuel used in known auto-engines having such a compression ratio $\epsilon$.

According to a feature of the invention, the predetermined load level corresponds to an engine power which falls below the power output of the engine at full load by at least 10%.

Combustion of the fuel-air mixture above the aforementioned predetermined load level can be controlled by regulating both the time at which the fuel-air mixture is ignited and the volume of fuel-air mixture drawn into the engine.

The volume of fuel-air mixture drawn into the engine is conveniently regulated by means of a fixed constriction arranged in an inlet passage to the engine, wherein the constriction is arranged in a portion of the inlet passage in the cylinder head or corresponding part of the engine, and wherein the through-flow area of the constriction decreases progressively in the flow direction, and wherein the passage immediately downstream of the contriction is abruptly widened concentrically with said constriction. Such a constriction and widening of the inlet passage of an engine provides a reduction of inflowing fuel-air mixture at least at high loads, and within a large portion of the r.p.m. range of the engine, and creates also turbulence in said mixture, which turbulence is strong in comparison with known turbulence-forming inlet structures. Thus, such a constriction and widening enables a well-mixed, fuel-air mixture to flow into the engine already at relatively low engine speeds and loads. The features of the constriction and the widening of the inlet passage are particularly advantageous with cold engine starts, since the engine is supplied with a homogeneous fuel-air mixture which enables the engine to quickly run smoothly and evenly.

Preferably, the through-flow area of the constriction in the inlet passage is restricted to a value which is at maximum seventy percent (70%) of the minimum through-flow area of the inlet passage downstream of the aforesaid widened portion.

The invention will be described firstly by comparison with a known Ottocycle engine having a compression ratio $\epsilon$ of 9:1 and the engine of which is intended for 97 octane fuel, so that when running at fuel load the engine is able to produce maximum output without risk of self-ignition during the combustion process.

Figure 2:
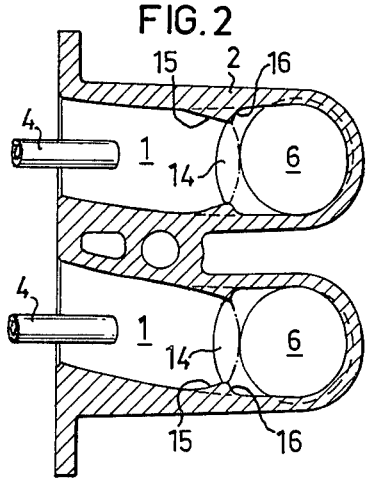

So that the invention will be more readily understood and optional features thereof made apparent, embodiments of inlet passages constructed in accordance with the invention will be described with reference to the accompanying drawing, in which:

FIG. 1 is a cross-sectional diagrammatic view of an inlet passage to a combustion chamber in an Otto-cycle engine, FIG. 2 is a horizontal cross-sectional view of two inlet passages according to FIG. 1, and FIGS. 3 and 4 are cross-sectional views of alternative embodiments of inlet passages in an engine.

In accordance with the invention, the efficiency of the engines when working at part-load is increased by increasing the compression ratio $\epsilon$ of the engine to a very high value when compared with previously known Otto-engines, for example 12:1. Despite this increase in the compression ratio, the engine is supplied with 97 octane fuel. This increase in the compression ratio means that combustion of the fuel-air mixture can take place at pressures and temperatures which are much higher than was previously the case, which results in a higher thermal efficiency of the engine. The volume of fuel-air mixture drawn into the engine, however, increases with the load and as a result thereof the pressure and temperatures occurring during the combustion process reach such magnitude before the engine is fully loaded that self-ignition of the fuel-air mixture is imminent. Consequently, the combustion process is controlled within the upper load range, i.e. the range near the full load of the engine, so as to avoid such self-ignition. This control can be effected by regulating one or more of the following parameters:

(A) ignition timing
(B) volume of fuel-air mixture drawn into the engine
(C) extent to which the exhaust gases are recirculated
(D) temperature of the incoming air
(E) the ratio of fuel to air By delaying the ignition timing, i.e. by causing the fuel-air mixture to be ignited at a later stage during the compression stroke than is otherwise normal, the mixture is burned later during the expansion stroke. This means that combustion takes place at a lower pressure and temperature than was previsouly the case. Such a measure eliminates the risk of self-ignition at the cost of an impaired power output, which in the present case reaches a maximum of 12%.

The combustion process also takes place at a lower pressure and temperature when the volume of fuel-air mixture drawn into the engine at high engine loads is reduced, so that self-ignition of the fuel-air mixture is avoided. This decrease is obtained by adopting one or more of the following measures:

(a) providing a fixed constriction in the inlet passage
(b) providing the inlet passage with a controllable constriction which will respond to changes in engine speed, and
(c) changing the opening and closing times of the valve.

The fixed constriction for limiting the fuel-air mixture drawn into the engine can be achieved in a number of different ways. For example, the maximum extent to which the throttle valve can be opened may be restricted so that the partial vacuum in the inlet passage increases at full load (inlet manifold depression), thereby reducing the amount of fuel air mixture drawn into the engine. On the other hand, the fixed constriction may also be in the form of a turbulence-forming, inwardly or outwardly bulging portion of the inlet passage. This measure will also result in the desired pressure drop, although there is also obtained a rapid combustion process which further reduces the tendency of self-ignition. Advantageous embodiments of such fixed constrictions will be described with reference to the accompanying Figures.

A constriction in the inlet system, which constriction can be regulated in response to the engine speed, may conveniently have the form of a centrifugal regulator which senses the engine speed and which acts upon the throttle valve so that its opening angle increases with increased engine speed. It is a known fact that the risk of self-ignition of the fuel-air mixture during combustion decrease with increasing engine speed since, with a certain position of the throttle, the volume of fuel-air mixture drawn into the engine decreases with increasing engine speed.

The amount of fuel-air mixture drawn into the engine can be reduced by restricting the opening time of the inlet valve. When the exhaust valve is closed early, volume of residual gases remaining from a preceding combustion stage will increase. The change in the valve timings of the engine is primarily decided by the relatively lower engine speed at which the risk of self-ignition of the mixture during a combustion process is greatest.

In FIGS. 1 and 2 there is shown the cylinder head 2 of a conventional multi-cylinder Otto-cycle engine. Arranged in the cylinder head 2 are inlet passages 1 which extend, in the normal manner, in the intake manifold 3 which, via a common branching chamber (not shown), communicates with the outer portions of the inlet system comprising the throttle valve and optionally a carburetor (not shown). In the illustrated embodiment, the engine is provided with injection valves 4 secured to the manifold 3, which valves dispense fuel into the inlet passages 1 in response to a control system (not shown). The inlet passages 1 discharge into the combustion chamber 5 of respective cylinders and arranged at each outlet 6 of the inlet passages in the cylinder head 2 is a valve seat 8 for an inlet valve 9 which is displaceably mounted in a valve guide 11 arranged on the cylinder head 2. With the valve position shown in FIG. 1, the inlet valve 9 adopts an open position between the inlet passage 1 and the combustion chamber 5.

The inner end of the valve guide 11 opens out into the inlet passage 1 through a flat-faced shoulder 12 in the cylinder head 2, said shoulder 12 projecting into the passage 1 in the form of a bead. Upstream of the shoulder 12, the inlet passage 1 is provided with a restriction 15 which successively decreases the cross-sectional area of the inlet passage 1 in the flow direction to form an end constriction 14. The constriction is terminated abruptly with a shoulder-like widened portion 16 to form an inlet passage area which substantially coincides with the area of the outlet 6 of the inlet passage to the combustion chamber 5. The constriction 14 and the widened portion 16 arranged downstream thereof are substantially concentric, this being important to obtain the desired turbulence with respect to the fuel-air mixture by means of the restriction.

In the embodiment shown in FIG. 1, the smallest through-flow area of the constriction 14 is approximately forty-five percent (45%) of the smallest area downstream of the widened portion 16, which in the illustrated case is arranged adjacent the outlet 6 of the inlet passage. In the case of an engine having a capacity of 2 liters and intended for propulsion of a vehicle having a service weight of 1,200 kg, it has been found advantageous to maintain a ratio between said areas in the order of magnitude of between forty and fifty-five percent (40 –55%). The constriction is operative to inhibit the flow therethrough in a manner to obtain the intentional decrease in the efficiency of the engine at high loads within a high engine speed, in the case of an engine whose compression ratio and fuel-flow conditions have been determined in accordance with predetermined conditions. This inhibiting effect offered by the constriction 14,15 to the flow of working medium through the passage becomes more marked the more the engine speed and the load said engine increases. The relationship between said areas, however, should not exceed a limiting value of seventy percent (70%) if the constriction is to fulfill the requirement of decreased flow at high loads and at high engine speed.

The inhibiting effect of the constriction 14,15 to the flow of the fuel-air mixture through the passage mainly derives from the turbulence imparted to the fuel-air mixture flowing into the combustion chamber 5 by the abrupt widened portion 16. A well-mixed fuel-air mixture is necessary if combustion is to take place smoothly and quietly, and hence the fact that turbulence is created in the fuel-air mixture can be considered to improve the fuel economy and also to improve the composition of the exhaust gas with respect to its harmful constituents. With an engine constructed in accordance with the invention, the hydrocarbon content of the exhaust gases is kept to particularly favourable values, whilst the oxides of nitrogen content ($NO_x$), does not change appreciably in comparison with conventional Otto-cycle engines.

From the aspect of flow technique, the speed at which the gas flows along the restriction 15 in the inlet passage 1 is caused to increase. This increase in the flow rate reduces the tendency of fuel to separate from the fuel-air mixture. Such separation of the fuel from the mixture is often the reason, in conventional engines, why unevenly mixed fuel-air mixtures are supplied to the cylinders; this is particularly true when the engine has not been heated to its full operational temperature. To facilitate the supply of fuel-air mixture to the cylinders during different operating conditions, the lower generatrix plane of each inlet passage 1 is inclined to the outlet 6 in the cylinder. Thus, separated or precipitated fuel is deposited on the walls of the inlet passage 1, particularly when the engine has not reached full operating temperature, and will migrate towards the widened portion 16 and, since the widened portion extends around the whole periphery of the passage, all the precipitated fuel will be mixed with the remaining fuel-air mixture, by the turbulence caused in the passage. The constriction 14 ensures that the engine will rapidly run smoothly and quietly, even with a cold start. Furthermore, the constriction 14 is conveniently arranged so that the widened portion 16 lies immediately upstream of the opening of the valve-guide 11 in the inlet passage 1. In this way there is provided a length of passage in which the fuel and air can be further mixed in the inlet passage 1, prior to entering the combustion chamber 5.

In addition to providing a constriction in each inlet passage 1 of respective cylinders, it is also convenient to provide a turbulence-forming constriction upstream of the manifold chamber of the inlet system of a vehicle provided with a carburetor. A fuel-air mixture which has been well mixed by such a constriction ensures that a uniform fuel-air mixture flows to respective cylinders from the manifold chambers.

From the manufacturing aspect, it has been found that suitable constrictions can be obtained by casting. In order to obtain a strong edge portion adjacent the widened portion 16, it has been found convenient to chamfer the terminal portion of the constriction 14, as shown in FIG. 3, this portion exhibiting a substantially cylindrical shape just prior to the widened portion 16.

It may also be convenient to provide the inlet passage 1 in the cylinder head 2 with a widened portion adjacent a separate valve seat 8 for the inlet valve 9, as shown in FIG. 4. In this way, the edge portion of the widened portion can be machined to a shape favourable to cause turbulence in the fuel-air mixture, and to this end the valve seat 8 is suitably arranged in a shoulder-like opening against an abutment surface 17. It is also possible for the constriction 14 to be formed by an insertable unit. Similarly, the means for forming the constriction 14 may have the form of a unit combined with the valve seat 8 for attachment in or adjacent to the outlet 6 of the inlet passage in the combustion chamber 5.

In addition to controlling the combustion process by means of regulating the aforementioned parameters A and B, either individually or together, the risk of self-ignition can be reduced during the combustion process by recirculating the exhaust gas, thereby increasing the percentage of combustion waste gases in the gas mixture which is compressed. This measure involves mixing, through a connection between the cylinder outlet and the cylinder inlet, a certain portion of the exhaust gases in the fuel-air mixture which flows into a cylinder of the engine during a suction stroke. The amount of exhaust gas mixed with the combustion gases in this way, can be controlled by means of a valve arranged in said connection, said valve in turn being controlled in response to the suction pressure, i.e. the load on the engine.

The engine may also be provided with cooling means for the inlet air. Provided that the engine is operating at an unchanged power output, a decrease in temperature of the fuel-air mixture sucked into the engine results in a lower combustion temperature and, therewith, less risk of self-ignition during the combustion process.

It is also possible to decrease the risk of self-ignition during the combustion process at high loads, by ensuring that the amount of fuel in the fuel-air mixture drawn into the engine is relatively great or relatively small with regard to the amount of air contained in said mixture, i.e. the mixture is relatively rich or relatively poor with respect to fuel. Since, in both cases, the combustion temperature decreases, it is possible to decrease the risk of self-ignition also in this manner.

Tests carried out on the engines of saloon cars have shown particularly positive results when the efficiency of the engine has been intentionally reduced by applying one or more of the aforementioned measures at a level of load corresponding to an engine power which falls below the power of the engine at full load at the engine speed in question, by at least 10%.

The invention is not restricted to the aforedescribed embodiment, but can be modified within the scope of the following claims for the purpose of improving the distribution of power in combustion engines.

What we claim is:

1. A method of operating a spark-ignition internal combustion engine, characterized in that the engine is given a fixed compression ratio and is supplied with a fuel having a certain octane number and pre-selected spontaneous combustion characteristics such that the engine is only able to operate at optimum efficiency in a lower load range up to a pre-determined load level without spontaneous combustion during the combustion process of the fuel-air mixture, while in an upper load range above said pre-determined load level, the engine is consciously controlled at non-optimum efficiency by means which control the combustion of the fuel-air mixture in such a manner as to prevent spontaneous combustion during the combustion process of the fuel-air mixture, characterized in that the combustion of the fuel-air mixture is controlled above the pre-determined load level by regulating the instant at which the fuel-air mixture is ignited when the engine speed is below a pre-determined value, and by controlling the volume of fuel-air mixture fed to the engine at engine speeds equal to or greater than said predetermined value.

2. A method according to claim 1, characterized in that the predetermined load level corresponds to an engine power at least 10% below the power output of the engine at full load.

3. A method according to claim 2, characterized in that the inflowing volume of fuel-air mixture is regulated by means of one or more throats arranged in the induction system of the engine.

4. A method according to claim 2, characterized in that the combustion process of the air-fuel mixture above said pre-determined load level is also controlled by returning exhaust gases to respective combustion chambers, and in that the quantity of exhaust gases admixed with the volume of fuel-air mixture flowing into the engine is regulated.

5. A spark-ignition internal combustion engine in which the compression ratio is set at a preferred fixed value, the engine being intended for use with a fuel having a certain octane number and preselected spontaneous combustion characteristics such that the engine is only able to operate at optimum efficiency in a lower load range, i.e. up to a pre-determined load level, without spontaneous combustion during the combustion process of the fuel-air mixture, the engine being provided with means for controlling the volume of fuel-air mixture fed to the combustion chamber, whereby in an upper load range, i.e. above said predetermined load level said volume is consciously controlled by said means so that the engine is operating at non-optimum efficiency in said upper load range in order to prevent spontaneous combustion, characterized in that a fixed throat is arranged in an inlet passage leading to the engine for controlling the volume of fuel-air mixture fed to the engine.

6. An engine according to claim 5, characterized in that the fixed throat is arranged in a portion of an inlet passage in a cylinder head of the engine; that the through-flow area of the throat gradually reduces in the direction of flow of the fuel-air mixture; and in that the throat is terminated with a substantially concentric, abrupt widening to the subsequent portion of the inlet passage.

7. An engine according to claim 6, characterized in that the smallest through-flow area of the throat in the inlet passage is at maximum seventy percent (70%) of the smallest through-flow area of the inlet passage downstream of the widened portion.

8. An engine according to claim 7, characterized in that the ratio between the areas is selected at a value of between forty and fifty-five percent (40–55%).

9. An engine according to claim 7, characterized in that the widened portion is arranged immediately upstream of a valve guide projecting into the inlet passage and being arranged to co-operate with an inlet valve.

10. An engine according to claim 7, characterized in that the widened portion is arranged adjacent a separate valve seat insert of an inlet valve mounted in the cylinder head.

11. An engine according to claim 7, characterized in that the constriction immediately upstream of the widened portion is provided with a chamfered edge portion and forms a substantially cylindrical edge the throat in the inlet passage.

12. A spark-ignition internal combustion engine of the Otto-cycle type, said engine having a fixed compression ratio whereby when supplied with a mixture of air and fuel having an octane number lower than normally appropriate to said compression ratio said engine operates in a range below a predetermined high load without spontaneous combustion of the fuel-air mixture but will be susceptible to spontaneous combustion of the fuel-air mixture when operated above said predetermined high load, and means for controlling combustion of the fuel-air mixture when operating above said predetermined high load in a manner to decrease the efficiency of the engine and to prevent the spontaneous combustion of the fuel-air mixture which would otherwise occur.

* * * * *